(12) United States Patent  
Hogan et al.

(10) Patent No.: US 8,962,745 B2
(45) Date of Patent: Feb. 24, 2015

(54) FUNCTIONALIZED POLYMERS AND VULCANIZATES WITH REDUCED HYSTERETIC LOSS

(75) Inventors: Terrence E. Hogan, Uniontown, OH (US); Xiao-Dong Pan, Akron, OH (US); Kenji Nakatani, Kodaira (JP); Ryota Tamate, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 631 days.

(21) Appl. No.: 13/337,610

(22) Filed: Dec. 27, 2011

(65) Prior Publication Data

US 2012/0165464 A1 Jun. 28, 2012

Related U.S. Application Data

(60) Provisional application No. 61/427,246, filed on Dec. 27, 2010.

(51) Int. Cl.
*C08L 9/06* (2006.01)
*C08F 8/00* (2006.01)

(52) U.S. Cl.
USPC ............. 524/575; 525/332.9; 525/331.9; 525/571

(58) Field of Classification Search
USPC ............. 524/575; 525/332.9, 331.9, 571
See application file for complete search history.

(56) References Cited

U.S. PATENT DOCUMENTS

| | | |
|---|---|---|
| 3,423,006 A | 1/1969 | Stedinan et al. |
| 3,652,516 A | 3/1972 | Farrar et al. |
| 5,268,439 A | 12/1993 | Hergenrother et al. |
| 5,329,005 A | 7/1994 | Lawson et al. |
| 5,332,810 A | 7/1994 | Lawson et al. |
| 5,393,721 A | 2/1995 | Kitamura et al. |
| 5,491,230 A | 2/1996 | Lawson et al. |
| 5,496,940 A | 3/1996 | Lawson et al. |
| 5,521,309 A | 5/1996 | Antkowiak et al. |
| 5,552,483 A | 9/1996 | Hergenrother et al. |
| 5,574,109 A | 11/1996 | Lawson et al. |
| 5,578,542 A | 11/1996 | Lawson et al. |
| 5,698,646 A | 12/1997 | Kitamura et al. |
| 5,786,441 A | 7/1998 | Lawson et al. |
| 7,153,919 B2 | 12/2006 | Hogan et al. |
| 7,335,712 B2 | 2/2008 | Yan et al. |
| 7,767,774 B2 * | 8/2010 | Suzuki et al. ............... 526/194 |
| 7,868,110 B2 | 1/2011 | Yan |
| 2006/0264590 A1 | 11/2006 | Hogan et al. |
| 2007/0149665 A1 * | 6/2007 | Mowrey et al. ............... 524/262 |
| 2008/0171827 A1 | 7/2008 | Hogan et al. |
| 2010/0190885 A1 * | 7/2010 | Hua et al. ............... 523/152 |
| 2013/0030133 A1 * | 1/2013 | Hogan et al. ............... 526/82 |

* cited by examiner

*Primary Examiner* — Robert D. Harlan
(74) *Attorney, Agent, or Firm* — Meredith E. Hooker; Arthur M. Reginelli

(57) ABSTRACT

A method for preparing a functionalized polymer, the method comprising the step of reacting a reactive polymer with a functionalizing agent defined by formula I or formula II:

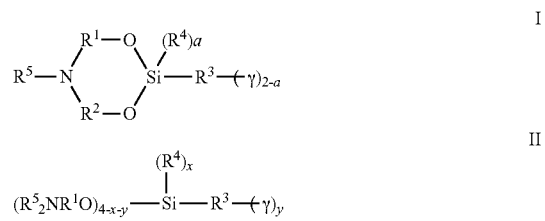

or combinations thereof, where $R^1$, $R^2$, and $R^3$ are each independently a divalent organic group, $R^4$ and $R^5$ are each independently a monovalent organic group, a is an integer from 0 to 1, x is an integer from 0 to 2, y is an integer from 1 to 3, x+y=3, and γ is a protected amino group.

28 Claims, No Drawings

FUNCTIONALIZED POLYMERS AND VULCANIZATES WITH REDUCED HYSTERETIC LOSS

This application claims the benefit of U.S. Provisional Application Ser. No. 61/427,246, filed on Dec. 27, 2011, which is incorporated herein by reference.

FIELD OF THE INVENTION

One or more embodiments of the present invention relate to functionalized polymers and methods for their manufacture, as well as vulcanizates prepared therewith that exhibit reduced hysteretic loss.

BACKGROUND OF THE INVENTION

In the art of manufacturing tires, it is desirable to employ rubber vulcanizates that demonstrate reduced hysteresis, i.e., less loss of mechanical energy to heat. For example, rubber vulcanizates that show reduced hysteresis are advantageously employed in tire components, such as sidewalls and treads, to yield tires having desirably low rolling resistance. The hysteresis of a rubber vulcanizate is often attributed to the free polymer chain ends within the crosslinked rubber network, as well as the dissociation of filler agglomerates. Functionalized polymers have been employed to reduce hysteresis of rubber vulcanizates. The functional group of the functionalized polymer may reduce the number of free polymer chain ends via interaction with filler particles. Also, the functional group may reduce filler agglomeration. Nevertheless, whether a particular functional group imparted to a polymer can reduce hysteresis is often unpredictable.

End-functionalized polymers may be prepared by reacting a functionalizing agent with an active polymer chain (e.g., a living polymer chain). For example, anionic initiators are known to be useful for the polymerization of conjugated diene monomers to form polydienes having a combination of 1,2-, cis-1,4- and trans-1,4-linkages. Anionic initiators are also useful for the copolymerization of conjugated diene monomers with vinyl-substituted aromatic compounds. The polymers prepared with anionic initiators may have an active end, which may also be referred to as a reactive chain end, that may be capable of reacting with additional monomers for further chain growth or reacting with certain functionalizing agents to give functionalized polymers.

But, the ability to react functionalizing agents with active polymer chains can be unpredictable. Moreover, the ability to choose functionalizing agents that will yield a desired degree of hysteretic loss within particular vulcanizates is unpredictable.

Because functionalized polymers are advantageous, especially in the manufacture of tires, there exists a need to develop new functionalized polymers that provide vulcanizates with reduced hysteresis.

SUMMARY OF THE INVENTION

One or more embodiments of the present invention provide a method for preparing a functionalized polymer, the method comprising the step of reacting a reactive polymer with a functionalizing agent defined by formula I or formula II:

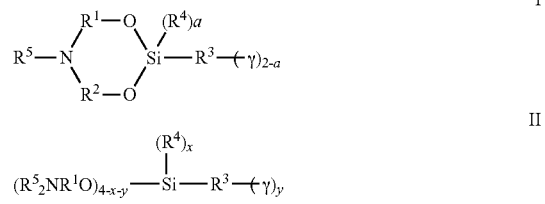

or combinations thereof, where $R^1$, $R^2$, and $R^3$ are each independently a divalent organic group, $R^4$ and $R^5$ are each independently a monovalent organic group, a is an integer from 0 to 1, x is an integer from 0 to 2, y is an integer from 1 to 3, $x+y \leq 3$, and $\gamma$ is a protected amino group.

One or more embodiments of the present invention provide a method for preparing a functionalized polymer, the method comprising the step of reacting a reactive polymer with a functionalizing agent wherein is selected from the group consisting of acyclic aminoalkoxy silanes containing a protected amino group and cyclic aminoalkoxy silanes containing a protected amino group.

One or more embodiments of the present invention provide a method for preparing a functionalized polymer, the method comprising the step of reacting a reactive polymer with a functionalizing agent wherein is selected from the group consisting of acyclic aminoalkoxy silanes containing a protected amino group and cyclic aminoalkoxy silanes containing a protected amino group.

One or more embodiments of the present invention provide a vulcanizable composition of matter including silica and a functionalized polymer defined by Formulas XII and XIII

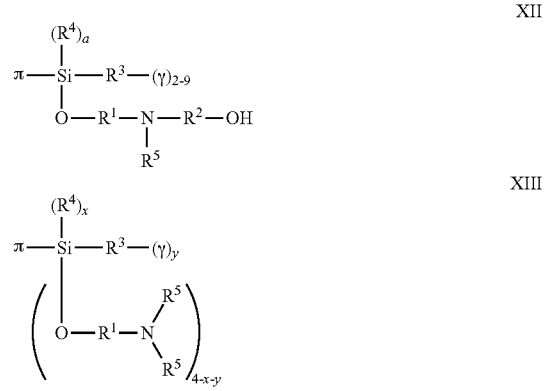

or combinations thereof, where $R^1$, $R^2$, and $R^3$ are each independently a divalent organic group, $R^4$ and $R^5$ are each independently a monovalent organic group, a is an integer from 0 to 1, x is an integer from 0 to 2, y is an integer from 1 to 3, $x+y \leq 3$, and $\gamma$ is a protected amino group

DETAILED DESCRIPTION OF ILLUSTRATIVE EMBODIMENTS

Introduction

Embodiments of this invention are based on the discovery of new functionalized polymers that are prepared by functionalizing anionically-polymerized polymers with certain aminoalkoxy silanes containing a protected amino group. The functionalized polymers unexpectedly produce vulcanizates that exhibit reduced hysteretic loss at 50° C., especially in silica-filled vulcanizates. Also, these polymers show technologically useful hysteretic loss at 0° C.

Polymer Preparation

In one or more embodiments, the anionically-polymerized polymers are prepared by anionic polymerization, wherein monomer is polymerized by using an anionic initiator. The key mechanistic features of anionic polymerization have been described in books (e.g., Hsieh, H. L.; Quirk, R. P. Anionic Polymerization: Principles and Practical Applications; Marcel Dekker: New York, 1996) and review articles (e.g., Hadjichristidis, N.; Pitsikalis, M.; Pispas, S.; Iatrou, H.; Chem. Rev. 2001, 101(12), 3747-3792). Anionic initiators may advantageously produce reactive polymers (e.g. living polymers) that, prior to quenching, are capable of reacting with additional monomers for further chain growth or reacting with certain functionalizing agents to give functionalized polymers. As those skilled in the art appreciate, these reactive polymers include a reactive chain end, which is believed to be ionic, at which a reaction between the functionalizing agent and the polymer takes place.

In one or more embodiments, the anionically-polymerized polymers are prepared by polymerizing conjugated diene monomer and optionally monomer copolymerizable therewith. Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. Examples of monomer copolymerizable with conjugated diene monomer include vinyl-substituted aromatic compounds such as styrene, p-methylstyrene, α-methylstyrene, and vinylnaphthalene.

The practice of this invention is not limited by the selection of any particular anionic initiators. In one or more embodiments, the anionic initiator employed is a functional initiator that imparts a functional group at the head of the polymer chain (i.e., the location from which the polymer chain is started). In particular embodiments, the functional group includes one or more heteroatoms (e.g., nitrogen, oxygen, boron, silicon, sulfur, tin, and phosphorus atoms) or heterocyclic groups. In certain embodiments, the functional group reduces the 50° C. hysteresis loss of carbon-black and/or silica filled vulcanizates prepared from polymers containing the functional group as compared to similar filled vulcanizates prepared from polymer that does not include the functional group.

Exemplary anionic initiators include organolithium compounds. In one or more embodiments, organolithium compounds may include heteroatoms. In these or other embodiments, organolithium compounds may include one or more heterocyclic groups.

Types of organolithium compounds include alkyllithium, aryllithium compounds, and cycloalkyllithium compounds. Specific examples of organolithium compounds include ethyllithium, n-propyllithium, isopropyllithium, n-butyllithium, sec-butyllithium, t-butyllithium, n-amyllithium, isoamyllithium, and phenyllithium. Still other anionic initiators include organosodium compounds such as phenylsodium and 2,4,6-trimethylphenylsodium. Also contemplated are those anionic initiators that give rise to di-living polymers, wherein both ends of a polymer chain is living. Examples of such initiators include dilithio initiators such as those prepared by reacting 1,3-diisopropenylbenzene with sec-butyllithium. These and related difunctional initiators are disclosed in U.S. Pat. No. 3,652,516, which is incorporated herein by reference. Radical anionic initiators may also be employed, including those described in U.S. Pat. No. 5,552,483, which is incorporated herein by reference.

In particular embodiments, the organolithium compounds include a cyclic amine-containing compound such as lithiohexamethyleneimine. These and related useful initiators are disclosed in the U.S. Pat. Nos. 5,332,810, 5,329,005, 5,578, 542, 5,393,721, 5,698,646, 5,491,230, 5,521,309, 5,496,940, 5,574,109, and 5,786,441, which are incorporated herein by reference. In other embodiments, the organolithium compounds include alkylthioacetals (e.g., dithianes) such as 2-lithio-2-methyl-1,3-dithiane. These and related useful initiators are disclosed in U.S. Pat. No. 7,153,919, and U.S. Publ. Nos. 2006/0264590, and 2006/0264589, which are incorporated herein by reference. In still other embodiments, the organolithium compounds include alkoxysilyl-containing initiators, such as lithiated t-butyldimethylpropoxysilane. These and related useful initiators are disclosed in U.S. Pat. No. 7,335,712, which is incorporated herein by reference.

In one or more embodiments, the anionic initiator employed is trialkyltinlithium compound such as tri-n-butyltinlithium. These and related useful initiators are disclosed in U.S. Pat. Nos. 3,426,006 and 5,268,439, which are incorporated herein by reference.

Anionic polymerization may be conducted in polar solvents, non-polar solvents, and mixtures thereof. In one or more embodiments, a solvent may be employed as a carrier to either dissolve or suspend the initiator in order to facilitate the delivery of the initiator to the polymerization system. In other embodiments, monomer can be used as the carrier. In yet other embodiments, the initiator can be used in their neat state without any solvent.

In one or more embodiments, suitable solvents include those organic compounds that will not undergo polymerization or incorporation into propagating polymer chains during the polymerization of monomer in the presence of catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization. Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

When preparing elastomeric copolymers, such as those containing conjugated diene monomers and vinyl-substituted aromatic monomers, the conjugated diene monomers and vinyl-substituted aromatic monomers may be used at a ratio of 95:5 to 50:50, or in other embodiments, 95:5 to 65:35. In order to promote the randomization of comonomers in copolymerization and to control the microstructure (such as 1,2-linkage of conjugated diene monomer) of the polymer, a randomizer, which is typically a polar coordinator, may be employed along with the anionic initiator.

Compounds useful as randomizers include those having an oxygen or nitrogen heteroatom and a non-bonded pair of electrons. Examples include linear and cyclic oligomeric oxolanyl alkanes; dialkyl ethers of mono and oligo alkylene glycols (also known as glyme ethers); "crown" ethers; tertiary amines; linear THF oligomers; and the like. Linear and cyclic oligomeric oxolanyl alkanes are described in U.S. Pat. No. 4,429,091, which is incorporated herein by reference. Specific examples of compounds useful as randomizers include 2,2-bis(2'-tetrahydrofuryl)propane, 1,2-dimethoxyethane, N,N,N',N'-tetramethylethylenediamine (TMEDA), tetrahydrofuran (THF), 1,2-dipiperidylethane, dipiperidylmethane, hexamethylphosphoramide, N—N'-dimethylpiperazine, diazabicyclooctane, dimethyl ether, diethyl ether, tri-n-butylamine, and mixtures thereof. In other embodiments, potassium alkoxides can be used to randomize the styrene distribution.

The amount of randomizer to be employed may depend on various factors such as the desired microstructure of the polymer, the ratio of monomer to comonomer, the polymerization temperature, as well as the nature of the specific randomizer employed. In one or more embodiments, the amount of randomizer employed may range between 0.05 and 100 moles per mole of the anionic initiator.

The anionic initiator and the randomizer can be introduced to the polymerization system by various methods. In one or more embodiments, the anionic initiator and the randomizer may be added separately to the monomer to be polymerized in either a stepwise or simultaneous manner. In other embodiments, the anionic initiator and the randomizer may be pre-mixed outside the polymerization system either in the absence of any monomer or in the presence of a small amount of monomer, and the resulting mixture may be aged, if desired, and then added to the monomer that is to be polymerized.

Production of the reactive polymer can be accomplished by polymerizing conjugated diene monomer, optionally together with monomer copolymerizable with conjugated diene monomer, in the presence of an effective amount of the initiator. The introduction of the initiator, the conjugated diene monomer, optionally the comonomer, and any solvent if employed forms a polymerization mixture in which the reactive polymer is formed. The amount of the initiator to be employed may depend on the interplay of various factors such as the type of initiator employed, the purity of the ingredients, the polymerization temperature, the polymerization rate and conversion desired, the molecular weight desired, and many other factors.

In other embodiments, where an anionic initiator (e.g., an alkyllithium compound) is employed, the initiator loading may be varied from about 0.05 to about 100 mmol, in other embodiments from about 0.1 to about 50 mmol, and in still other embodiments from about 0.2 to about 5 mmol per 100 gram of monomer.

In one or more embodiments, the polymerization may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst or initiator. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

The polymerization may be conducted in any conventional polymerization vessels known in the art. In one or more embodiments, solution polymerization can be conducted in a conventional stirred-tank reactor.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

Functionalization

As discussed above, some or all of the resulting polymer chains may possess, before the polymerization is quenched, reactive chain ends, which chain ends may be referred to as living or active. The percentage of polymer chains possessing a reactive end depends on various factors such as the type of initiator, the type of monomer, the purity of the ingredients, the polymerization temperature, the monomer conversion, and many other factors. In one or more embodiments, at least about 20% of the polymer chains possess a reactive end, in other embodiments at least about 50% of the polymer chains possess a reactive end, and in still other embodiments at least about 80% of the polymer chains possess a reactive end. In any event, the reactive polymer can be reacted with the aminoalkoxy silanes containing a protected amino group according to the present invention (which may be simply referred to as functionalizing agents) to form the functionalized polymer of this invention.

In one or more embodiments, the aminoalkoxy silanes containing a protected amino group, which may be referred to herein simply as functionalizing agents, may be defined by formula I or formula II:

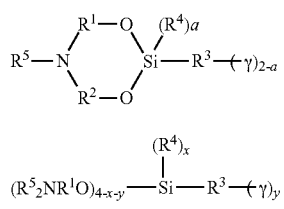

or combinations thereof, where $R^1$, $R^2$, and $R^3$ are each independently a divalent organic group, $R^4$ and $R^5$ are each independently a monovalent organic group, a is an integer from 0 to 1, x is an integer from 0 to 2, y is an integer from 1 to 3, x+y=3, and γ is a protected amino group. The compounds of formula I may be referred to as cyclic aminoalkoxy silanes, and the compounds of formula II may be referred to as acyclic aminoalkoxy silanes. In particular embodiments, a is 0, and in other embodiments a is 1. In particular embodiments, x is 0, in other embodiments x is 1, and in other embodiments x is 2. In particular embodiments, y is 1, in other embodiments y is 2, and in other embodiments y is 3.

In one or more embodiments, monovalent organic groups may include hydrocarbyl groups or substituted hydrocarbyl groups such as, but not limited to, alkyl, cycloalkyl, substituted cycloalkyl, alkenyl cycloalkenyl, substituted cycloalkenyl, aryl, allyl, substituted aryl, aralkyl, alkaryl, or alkynyl groups. Substituted hydrocarbyl groups include hydrocarbylene groups in which one or more hydrogen atoms have been replaced by a substituent such as an alkyl group. In one or more embodiments, these groups may include from one, or the appropriate minimum number of carbon atoms to form the group, to 20 carbon atoms. These hydrocarbyl groups may contain heteroatoms such as, but not limited to, nitrogen, boron, oxygen, silicon, sulfur, and phosphorus atoms.

In one or more embodiments, divalent organic groups may include hydrocarbylene groups or substituted hydrocarbylene groups such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups. Substituted hydrocarbylene groups include hydrocarbylene groups in which one or more hydrogen atoms have been replaced by a substituent such as an alkyl group. In one or more embodiments, these groups may include two, or the appropriate minimum number of carbon atoms to form the group, to 20 carbon atoms. The divalent organic groups may also contain one or more heteroatoms such as, but not limited to, nitrogen, oxygen, boron, silicon, sulfur, and phosphorus atoms.

In one or more embodiments, protected amino groups (γ) include those amino groups that are formed or derived by replacing the two hydrogen atoms of the parent amino group (i.e. —NH$_2$) with other substituents such as hydrocarbyl or silyl groups, or in other embodiments a hydrocarbylene group to form a ketimine. Where the protected amino group includes a silyl group and a hydrocarbyl group, the group may be referred to as a monosilylated amino group. Where the protected amino group includes two silyl groups, the group may be referred to as a disilylated amino group. Where the protected amino group includes two hydrocarbyl groups, the group may be referred to as a dihydrocarbylamino group.

Exemplary types of protected amino groups include, but are not limited to, bis(trihydrocarbylsilyl)amino, bis(dihydrocarbylhydrosilyl)amino, 1-aza-2,ω-disilacyclohydrocarbyl (where ω indicates the size of the cyclohydrocarbyl ring), (trihydrocarbylsilyl)(hydrocarbyl)amino, (dihydrocarbylhydrosilyl)(hydrocarbyl)amino, 1-aza-2-silacyclohydrocarbyl, dihydrocarbylamino, 1-azacyclohydrocarbyl, and hydrocarbylimino groups.

In one or more embodiments, bis(trihydrocarbylsilyl) amino groups may be defined by the formula III

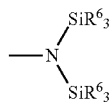

where each $R^6$ is independently a monovalent organic group.

Specific examples of bis(trihydrocarbylsilyl)amino groups include, but are not limited to, bis(trimethylsilyl)amino, bis(triethylsilyl)amino, bis(triisopropylsilyl)amino, bis(tri-n-propylsilyl)amino, bis(triisobutylsilyl)amino, bis(tri-t-butylsilyl)amino, and bis(triphenylsilyl)amino groups.

In one or more embodiments, bis(dihydrocarbylhydrosilyl)amino groups may be defined by the formula IV

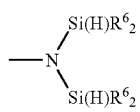

where each $R^6$ is independently a monovalent organic group.

Specific examples of bis(dihydrocarbylhydrosilyl)amino groups include, but are not limited to, bis(dimethylhydrosilyeamino, bis(diethylhydrosilyeamino, bis(diisopropylhydrosilyl)amino, bis(di-n-propylhydrosilyl)amino, bis(diisobutylhydrosilyl)amino, bis(di-t-butylhydrosilyl)amino, and bis(diphenylhydrosilyl)amino groups.

In one or more embodiments, 1-aza-2,ω-disilacyclohydrocarbyl groups may be defined by the formula V

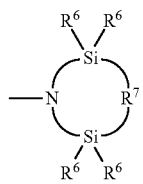

where each $R^6$ is independently a monovalent organic group and $R^7$ is a divalent organic group.

Specific examples of 1-aza-2,ω-disilacyclohydrocarbyl groups include, but are not limited to, 2,2,5,5-tetramethyl-1-aza-2,5-disila-1-cyclopentyl, 2,2,5,5-tetraethyl-1-aza-2,5-disila-1-cyclopentyl, 2,2,5,5-tetraphenyl-1-aza-2,5-disila-1-cyclopentyl, 2,2,6,6-tetramethyl-1-aza-2,6-disila-1-cyclohexyl, 2,2,6,6-tetraethyl-1-aza-2,6-disila-1-cyclohexyl, and 2,2,6,6-tetraphenyl-1-aza-2,6-disila-1-cyclohexyl groups.

In one or more embodiments, (trihydrocarbylsilyl)(hydrocarbyl)amino groups may be defined by the formula VI

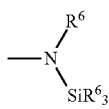

where each $R^6$ is independently a monovalent organic group.

Specific examples of (trihydrocarbylsilyl)(hydrocarbyl) amino groups include, but are not limited to, (trimethylsilyl)(methyl)amino, (triethylsilyl)(methyl)amino, (triphenylsilyl)(methyl)amino, (trimethylsilyl)(ethyl)amino, (triethylsilyl)(phenyl)amino, and (triisopropylsilyl)(methyl)amino groups.

In one or more embodiments, (dihydrocarbylhydrosilyl)(hydrocarbyl)amino groups may be defined by the formula VII

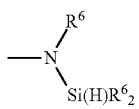

where each $R^6$ is independently a monovalent organic group.

Specific examples of (dihydrocarbylhydrosilyl)(hydrocarbyl)amino groups include, but are not limited to, (dimethylhydrosilyl)(methyl)amino, (diethylhydrosilyl)(methyl)amino, (diisopropylhydrosilyl)(methyl)amino, (di-n-propylhydrosilyl)(ethyl)amino, (diisobutylhydrosilyl)(phenyl)amino, (di-t-butylhydrosilyl)(phenyl)amino, and (diphenylhydrosilyl)(phenyl)amino groups.

In one or more embodiments, 1-aza-2-silacyclohydrocarbyl groups may be defined by the formula VIII

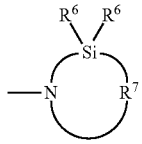

where each $R^6$ is independently a monovalent organic group and where $R^7$ is a divalent organic group.

Specific examples of 1-aza-2-silacyclohydrocarbyl groups include, but are not limited to, 2,2-dimethyl-1-aza-2-sila-1-cyclopentyl, 2,2-diethyl-1-aza-2-sila-1-cyclopentyl, 2,2-diphenyl-1-aza-2-sila-1-cyclopentyl, 2,2-diisopropyl-1-aza-2-sila-1-cyclohexyl, 2,2-dibutyl-1-aza-2-sila-1-cyclohexyl, and 2,2-diphenyl-1-aza-2-sila-1-cyclohexyl groups.

In one or more embodiments, dihydrocarbylamino groups may be defined by the formula IX

where each $R^6$ is independently a monovalent organic group.

Specific examples of dihydrocarbylamino groups include, but are not limited to, dimethylamino, diethylamino, di-n-propylamino, diisopropylamino, di-n-butylamino, diisobutylamino, dicyclohexylamino, diphenylamino, dibenzylamino, (methyl)(cyclohexyl)amino, (ethyl)(cyclohexyl)amino, (methyl)(phenyl)amino, (ethyl)(phenyl)amino, (methyl)(benzyl)amino, and (ethyl)(benzyl)amino groups.

In one or more embodiments, 1-azacyclohydrocarbyl groups may be defined by the formula X

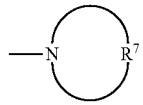

where $R^7$ is a divalent organic group.

Specific examples of 1-azacyclohydrocarbyl groups include, but are not limited to, aziridino, azetidino, pyrrolidino, piperidino, homopiperidino, morpholino, N-methylpiperazino, and N-methylhomopiperazino groups.

In one or more embodiments, hydrocarbylimino groups may be defined by the formula XI

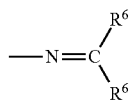

where each $R^6$ are individually a monovalent organic group, or where two $R^6$ may join to form a divalent organic group.

Specific examples of hydrocarbylimino groups include, but are not limited to, methylimino, ethylimino, propylimino, butylimino, pentylimino, hexylimino, cyclopentylimino, cyclohexylimino, benzylimino, and phenylimino groups.

Types of acyclic aminoalkoxy silanes include, but are not limited to, (bis(trihydrocarbylsilyl)amino)(hydrocarbyl)[di(hydrocarbylaminohydrocarbyloxy)]silanes, (bis(dihydrocarbylhydrosilyl)amino)(hydrocarbyl)[di(hydrocarbylaminohydrocarbyloxy)]silanes, (1-aza-2,ω-disilacyclohydrocarbyl)(hydrocarbyl)[di(hydrocarbylaminohydrocarbyloxy)]silanes, [(trihydrocarbylsilyl)(hydrocarbyl)amino](hydrocarbyl)[di(hydrocarbylaminohydrocarbyloxy)]silanes, [(dihydrocarbylhydrosilyl)(hydrocarbyl)amino](hydrocarbyl)[di(hydrocarbylaminohydrocarbyloxy)]silanes, (1-aza-2-silacyclohydrocarbyl)(hydrocarbyl)[di(hydrocarbylaminohydrocarbyloxy)]silanes, (dihydrocarbylamino)(hydrocarbyl)[di(hydrocarbylaminohydrocarbyloxy)]silanes, (1-azacyclohydrocarbyl)(hydrocarbyl)[di(hydrocarbylaminohydrocarbyloxy)]silanes, (hydrocarbylimino)(hydrocarbyl)[di(hydrocarbylaminohydrocarbyloxy)]silanes, (bis(trihydrocarbylsilyeamino)(dihydrocarbyl)(hydrocarbylaminohydrocarbyloxy)silanes, (bis(dihydrocarbylhydrosilyeamino)(dihydrocarbyl)(hydrocarbylaminohydrocarbyloxy)silanes, (1-aza-2,ω-disilacyclohydrocarbyl)(dihydrocarbyl)(hydrocarbylaminohydrocarbyloxy)silanes, [(trihydrocarbylsilyl)(hydrocarbyl)amino](dihydrocarbyl)(hydrocarbylaminohydrocarbyloxy)silanes, [(dihydrocarbylhydrosilyl)(hydrocarbyl)amino](dihydrocarbyl)(hydrocarbylaminohydrocarbyloxy)silanes, (1-aza-2-silacyclohydrocarbyl)(dihydrocarbyl)(hydrocarbylaminohydrocarbyloxy)silanes, (dihydrocarbylamino)(dihydrocarbyl)(hydrocarbylaminohydrocarbyloxy)silanes, (1-azacyclohydrocarbyl)(dihydrocarbyl)(hydrocarbylaminohydrocarbyloxy)silanes, (hydrocarbylimino)(dihydrocarbyl)(hydrocarbylaminohydrocarbyloxy)silanes, [di(bis(dihydrocarbylhydrosilyeamino)][di(hydrocarbylaminohydrocarbyloxy)]silanes [di(bis (dihydrocarbylhydrosilyeamino)][di(hydrocarbylaminohydrocarbyloxy)]silanes, [di(1-aza-2,ω-disilacyclohydrocarbyl)][di(hydrocarbylaminohydrocarbyloxy)]silanes, [di[(trihydrocarbylsilyl)(hydrocarbyl)amino)]][di(hydrocarbylaminohydrocarbyloxy)]silanes, [di[(dihydrocarbylhydrosilyl)(hydrocarbyl)amino)]][di(hydrocarbylaminohydrocarbyloxy)]silanes, [di(1-aza-2-silacyclohydrocarbyl)][di(hydrocarbylaminohydrocarbyloxy)]silanes, [di(dihydrocarbylamino)][di(hydrocarbylaminohydrocarbyloxy)]silanes, [di(1-azacyclohydrocarbyl)][di(hydrocarbylaminohydrocarbyloxy)]silanes, and [di(hydrocarbylimino)][di(hydrocarbylaminohydrocarbyloxy)]silanes.

Specific examples of cyclic aminoalkoxy silane functionalizing agents useful in practicing this invention include 1,5-dimethyl-5-(N,N-bis(trimethylsilyl)aminopropyl)-1-aza-4,6-dioxa-5-silacyclooctane, 1,5-dimethyl-5-(N,N-bis(dimethylhydrosilyeaminopropyl)-1-aza-4,6-dioxa-5-silacyclooctane, 1,5-dimethyl-5-(2,2,5,5-tetramethyl-1-aza-2,5-disila-1-cyclopentylpropyl)-1-aza-4,6-dioxa-5-silacyclooctane, 1,5-dimethyl-5-(N,N-(trimethylsilyl)(methyl)aminopropyl)-1-aza-4,6-dioxa-5-silacyclooctane, 1,5-dimethyl-5-(dimethylhydrosilyl)(methyl)aminopropyl)-1-aza-4,6-dioxa-5-silacyclooctane, 1,5-dimethyl-5-(2,2-dimethyl-1-aza-2-sila-1-cyclopentylpropyl)-1-aza-4,6-dioxa-5-silacyclooctane, 1,5-dimethyl-5-(N,N-dimethylaminopropyl)-1-aza-4,6-dioxa-5-silacyclooctane, 1,5-dimethyl-5-(piperidinopropyl)-1-aza-4,6-dioxa-5-silacyclooctane, and 1,5-dimethyl-5-(propyliminopropyl)-1-aza-4,6-dioxa-5-silacyclooctane.

Other specific examples of cyclic aminoalkoxy silane functionalizing agents include 1-methyl-5,5-di(N,N-bis(trimethylsilyl)aminopropyl)-1-aza-4,6-dioxa-5-silacyclooctane, 1-methyl-5,5-di(N,N-bis(dimethylhydrosilyl)aminopropyl)-1-aza-4,6-dioxa-5-silacyclooctane. 1-methyl-5,5-di(2,2,5,5-tetramethyl-1-aza-2,5-disila-1-cyclopentylpropyl)-1-aza-4,6-dioxa-5-silacyclooctane, 1-methyl-5,5-di(N,N-(trimethylsilyl)(methyl)aminopropyl)-1-aza-4,6-dioxa-5-silacyclooctane, 1-methyl-5,5-di(dimethylhydrosilyl)(methyl)aminopropyl)-1-aza-4,6-dioxa-5-silacyclooctane, 1-methyl-5,5-di(2,2-dimethyl-1-aza-2-sila-1-cyclopentylpropyl)-1-aza-4,6-dioxa-5-silacyclooctane, 1-methyl-5,5-di(N,N-dimethylaminopropyl)-1-aza-4,6-dioxa-5-silacyclooctane, 1-methyl-5,5-di(piperidinopropyl)-1-aza-4,6-dioxa-5-silacyclooctane, and 1-methyl-5,5-di(propyliminopropyl)-1-aza-4,6-dioxa-5-silacyclooctane.

Other specific examples of cyclic aminoalkoxy silane functionalizing agents include 1-ethyl-4-methyl-4-(N,N-bis(trimethylsilyl)aminopropyl)-1-aza-3,5-dioxa-4-silacyclohexane, 1-ethyl-4-methyl-4-(N,N-bis(dimethylhydrosilyl)aminopropyl)-1-aza-3,5-dioxa-4-silacyclohexane, 1-ethyl-4-methyl-4-(2,2,5,5-tetramethyl-1-aza-2,5-disila-1-cyclopentylpropyl)-1-aza-3,5-dioxa-4-silacyclohexane, 1-ethyl-4-methyl-4-(trimethylsilyl)(methyl)aminopropyl)-1-aza-3,5-dioxa-4-silacyclohexane, 1-ethyl-4-methyl-4-(dimethylhydrosilyl)(methyl)aminopropyl)-1-aza-3,5-dioxa-4-silacyclohexane, 1-ethyl-4-methyl-4-(2,2-dimethyl-1-aza-2-sila-1-cyclopentylpropyl)-1-aza-3,5-dioxa-4-silacyclohexane, 1-ethyl-4-methyl-4-(N,N-dimethylaminopropyl)-1-aza-3,5-dioxa-4-silacyclohexane, 1-ethyl-4-methyl-4-(piperidinopropyl)-1-aza-3,5-dioxa-4-silacyclohexane, and 1-ethyl-4-methyl-4-((propyliminopropyl)-1-aza-3,5-dioxa-4-silacyclohexane.

Specific examples of acyclic aminoalkoxy silane functionalizing agents useful in practicing this invention include (N,N-bis(trimethylsilyl)aminopropyl)(methyl)[di(2-dimethylaminoethoxy)]silane, (N,N-bis(dimethylhydrosilyl)aminopropyl)(methyl)[di(2-dimethylaminoethoxy)]silane, (2,2,5,5-tetramethyl-1-aza-2,5-disila-1-cyclopentylpropyl)(methyl)[di(2-dimethylaminoethoxy)]silane, (N,N-(trimethylsilyl)(methyl)aminopropyl)(methyl)[di(2-dimethylaminoethoxy)]silane, (N,N-(dimethylhydrosilyl)(methyl)aminopropyl)(methyl)[di(2-dimethylaminoethoxy)]silane, (2,2-dimethyl-1-aza-2-sila-1-cyclopentylpropyl)(methyl)[di(2-dimethylaminoethoxy)]silane, (N,N-dimethylaminopropyl)(methyl)[di(2-dimethylaminoethoxy)]silane, (piperidinopropyl)(methyl)[di(2-dimethylaminoethoxy)]silane, and (propyliminopropyl)(methyl)[di(2-dimethylaminoethoxy)]silane.

Other specific examples of acyclic aminoalkoxy silane functionalizing agents include (N,N-bis(trimethylsilyl)aminopropyl)(dimethyl)(2-dimethylaminoethoxy)silane, (N,N-bis(dimethylhydrosilyl)aminopropyl)(dimethyl)(2-dimethylaminoethoxy)silane, (2,2,5,5-tetramethyl-1-aza-2,5-disila-1-cyclopentylpropyl)(dimethyl)(2-dimethylaminoethoxy)silane, (N,N-(trimethylsilyl)(methyl)aminopropyl)(dimethyl)(2-dimethylaminoethoxy)silane, (N,N-(dimethylhydrosilyl)(methyl)aminopropyl)(dimethyl)(2-dimethylaminoethoxy)silane, (2,2-dimethyl-1-aza-2-sila-1-cyclopentylpropyl)(dimethyl)(2-dimethylaminoethoxy)silane, (N,N-dimethylaminopropyl)(dimethyl)(2-dimethylaminoethoxy)silane, (piperidinopropyl)(dimethyl)(2-dimethylaminoethoxy)silane, and (propyliminopropyl)(dimethyl)(2-dimethylaminoethoxy)silane.

Other specific examples of acyclic aminoalkoxy silane functionalizing agents include [di(N,N-bis(trimethylsilyl)aminopropyl)][di(2-dimethylaminoethoxy)]silane, [di(N,N-bis(dimethylhydrosilyl)aminopropyl)][di(2-dimethylaminoethoxy)]silane, [di(2,2,5,5-tetramethyl-1-aza-2,5-disila-1-cyclopentylpropyl)][di(2-dimethylaminoethoxy)]silane, [di(N,N-(trimethylsilyl)(methyl)aminopropyl)][di(2-dimethylaminoethoxy)]silane, [di(N,N-(dimethylhydrosilyl)(methyl)aminopropyl)][di(2-dimethylaminoethoxy)]silane, [di(2,2-dimethyl-1-aza-2-sila-1-cyclopentylpropyl)][di(2-dimethylaminoethoxy)]silane, [di(N,N-dimethylaminopropyl)][di(2-dimethylaminoethoxy)]silane, [di(piperidinopropyl)][di(2-dimethylaminoethoxy)]silane, and [(propyliminopropyl)][di(2-dimethylaminoethoxy)]silane.

In one or more embodiments, the aminoalkoxy silane functionalizing agents employed in this invention may be synthesized by hydrosilylation of a protected alkenylamine. Suitable protected alkenylamines include allyamine, 3-butenylamine, and 4-pentenylamine. Suitable hydrosilylating groups include 1,5-dimethyl-1-aza-4,6-dioxa-5-silacyclooctane and methyldi(2-dimethylaminoethoxy)silane. The hydrosilylation reaction is generally catalyzed by a metal catalyst containing platinum, rhodium, or iridium. The reaction may take place from room temperature to 200° C., for example from 50° C. to 150° C., or from 60° C. to 120° C.

Functionalization Reaction

The amount of the functionalizing agent that can be reacted with the reactive polymer may depend on various factors including the type and amount of catalyst or initiator used to initiate the polymerization and the desired degree of functionalization.

In one or more embodiments, the amount of the functionalizing agent employed can be described with reference to the amount of metal cation associated with the initiator. For example, where an organolithium initiator is employed, the molar ratio of the functionalizing agent to the lithium metal may be from about 0.1:1 to about 2:1, in other embodiments from about 0.3:1 to about 2:1, in other embodiments from about 0.6:1 to about 1.5:1, and in other embodiments from 0.8:1 to about 1.2:1.

In one or more embodiments, the functionalizing agent may be introduced to the polymerization mixture as a solution within an organic solvent. Suitable solvents include those described herein including those used to prepare the polymerization mixture. In certain embodiments, the same solvent employed to prepare the polymerization mixture can be used to prepare the solution of the functionalizing agent. Advantageously, one or more functionalizing agent of the present invention form technologically useful and stable solutions in aliphatic solvents such as hexane, cyclohexane, and/or derivatives thereof. In one or more embodiments, the concentration of the functionalizing agent in aliphatic solvent may be at least 0.05 molar, in other embodiments at least 0.5 molar, in other embodiments at least 1 molar and in other embodiments from about 0.5 to about 3 molar.

In one or more embodiments, the functionalizing agent may be reacted with the reactive polymer in conjunction with other reagents or compounds that may react with the reactive polymer. For example, the functionalizing agent may be employed in conjunction with a coupling agent that serves to couple two or more reactive polymer chains into a single macromolecule. Exemplary coupling agents include metal halides such as tin tetrachloride; metalloid halides such as silicon tetrachloride and boron trichloride; metal ester-carboxylate complexes such as dioctyltin bis(octylmaleate); alkoxysilanes such as tetraethyl orthosilicate and (3-glycidyloxypropyl)trimethoxysilane; and alkoxystannanes such as tetraethoxytin.

In one or more embodiments, the functionalizing agent can be reacted with the reactive polymer after a desired monomer conversion is achieved but before the polymerization mixture is quenched by a quenching agent. In one or more embodiments, the reaction between the functionalizing agent and the reactive polymer may take place within 180 minutes, in other embodiments within 60 minutes, in other embodiments within 30 minutes, in other embodiments within 5 minutes, and in other embodiments within one minute after the peak polymerization temperature is reached. In one or more embodiments, the reaction between the functionalizing agent and the reactive polymer can occur once the peak polymerization temperature is reached. In other embodiments, the reaction between the functionalizing agent and the reactive polymer can occur after the reactive polymer has been stored. In one or more embodiments, the storage of the reactive polymer occurs at room temperature or below under an inert atmosphere. In one or more embodiments, the reaction between the functionalizing agent and the reactive polymer may take place at a temperature from about 10° C. to about 150° C., and in other embodiments from about 20° C. to about 100° C. The time required for completing the reaction between the functionalizing agent and the reactive polymer depends on various factors such as the type and amount of the catalyst or initiator used to prepare the reactive polymer, the type and amount of the functionalizing agent, as well as the temperature at which the functionalization reaction is conducted. In one or more embodiments, the reaction between the functionalizing agent and the reactive polymer can be conducted for about 10 to 60 minutes.

Quenching

In one or more embodiments, after the reaction between the reactive polymer and the functionalizing agent has been accomplished or completed, a quenching agent can be added to the polymerization mixture in order to inactivate any residual reactive polymer chains and the catalyst or catalyst components. The quenching agent may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the quenching agent. The amount of the antioxidant employed may be in the range of 0.2% to 1% by weight of the polymer product.

In one or more embodiments, after the introduction of the functionalizing agent to the reactive polymer, optionally after the addition of a quenching agent and/or antioxidant, an optionally after recovery or isolation of the functionalized polymer, a condensation accelerator can be added to the polymerization mixture. Useful condensation accelerators include tin and/or titanium carboxylates and tin and/or titanium alkoxides. One specific example is titanium 2-ethylhexyl oxide. Useful condensation catalysts and their use are disclosed in U.S. Publication No. 2005/0159554A1, which is incorporated herein by reference.

Polymer Isolation

When the polymerization mixture has been quenched, the polymer product can be recovered from the polymerization mixture by using any conventional procedures of desolventization and drying that are known in the art. For instance, the polymer can be recovered by subjecting the polymer cement to steam desolventization, followed by drying the resulting polymer crumbs in a hot air tunnel. Alternatively, the polymer may be recovered by directly drying the polymer cement on a drum dryer. The content of the volatile substances in the dried polymer can be below 1%, and in other embodiments below 0.5% by weight of the polymer.

Polymer Product

While the functionalizing agent and reactive polymer are believed to react to produce novel functionalized polymers, the exact chemical structure of the functionalized polymer produced in every embodiment is not known with any great degree of certainty, particularly as the structure relates to the residue imparted to the polymer chain end by the functionalizing agent. Indeed, it is speculated that the structure of the functionalized polymer may depend upon various factors such as the conditions employed to prepare the reactive polymer (e.g., the type and amount of the initiator) and the conditions employed to react the functionalizing agent with the reactive polymer.

In one or more embodiments, one of the products resulting from the reaction between the functionalizing agent and the reactive polymer may include a functionalized polymer defined by the formula XII:

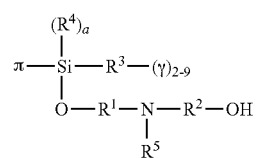

XII where π is an anionically-polymerized polymer chain, $R^1$, $R^2$, and $R^3$ are each independently a divalent organic group, $R^4$ and $R^5$ are each independently a monovalent organic group, a is an integer from 0 to 1, and γ is a protected amino group.

In other embodiments, one of the products resulting from the reaction between the functionalizing agent and the reactive polymer may include a functionalized polymer defined by the formula XIII:

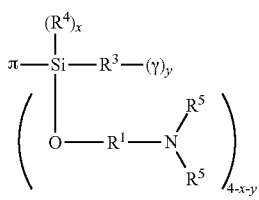

XIII where π is an anionically-polymerized polymer chain, $R^1$, $R^2$, and $R^3$ are each independently a divalent organic group, $R^4$ and $R^5$ are each independently a monovalent organic group, x is an integer from 0 to 2, y is an integer from 1 to 3, x+y=3, and γ is a protected amino group.

In one or more embodiments, the polymer chain (π) of the functionalized polymer contains unsaturation. In these or other embodiments, the polymer chain is vulcanizable. In particular embodiments, where the reactive polymer is prepared by employing a functional anionic initiator, the head of the polymer chain (π) includes a functional group that is the residue of the functional initiator.

The polymer chain can have a glass transition temperature ($T_g$) that is less than 0° C., in other embodiments less than −20° C., and in other embodiments less than −30° C. In one embodiment, the polymer chain may exhibit a single glass transition temperature.

In one or more embodiments, the polymer chain (π) prepared according to this invention may be medium or low cis polydienes (or polydiene copolymers) including those prepared by anionic polymerization techniques. These polydienes can have a cis content of from about 10% to 60%, in other embodiments from about 15% to 55%, and in other embodiments from about 20% to about 50%, where the percentages are based upon the number of diene mer units in the cis configuration versus the total number of diene mer units. These polydienes may also have a 1,2-linkage content (i.e. vinyl content) from about 10% to about 90%, in other embodiments from about 10% to about 60%, in other embodiments from about 15% to about 50%, and in other embodiments from about 20% to about 45%, where the percentages are based upon the number of diene mer units in the vinyl configuration versus the total number of diene mer units. The balance of the diene units may be in the trans-1,4-linkage configuration.

In particular embodiments, the polymer chain (π) may be a copolymer of butadiene, styrene, and optionally isoprene. These may include random copolymers. In other embodiments, the polymers are block copolymers of polybutadiene, polystyrene, and optionally polyisoprene. In particular embodiments, the polymers are hydrogenated or partially hydrogenated. In one or more embodiments, the polymer chain (π) is a copolymer of styrene and conjugated diene where the molar ratio of styrene mer units to conjugated diene mer units is from about 1:1 to about 0.05:1, in other embodiments from about 0.7:1 to about 0.1:1, and in other embodiments from about 0.5:1 to about 0.2:1.

In one or more embodiments, the polymer chain π is an anionically-polymerized polymer selected from the group consisting of polybutadiene, polyisoprene, poly(styrene-co-butadiene), poly(styrene-co-butadiene-co-isoprene), poly(isoprene-co-styrene), and poly(butadiene-co-isoprene). The number average molecular weight ($M_n$) of these polymers may be from about 1,000 to about 1,000,000, in other embodiments from about 5,000 to about 1,000,000, in other embodiments from about 50,000 to about 500,000, and in other embodiments from about 100,000 to about 300,000, as determined by using gel permeation chromatography (GPC) calibrated with polystyrene standards and Mark-Houwink constants for the polymer in question. The polydispersity ($M_w/M_n$) of these polymers may be from about 1.0 to about 3.0, and in other embodiments from about 1.1 to about 2.0.

In particular embodiments, the polymers of this invention are copolymers of 1,3-butadiene, styrene, and optionally isoprene. These may include random copolymers and block copolymers. In one or more embodiments, the random polydiene copolymers may include from about 10 to about 50% by weight, in other embodiments from about 15 to about 40% by weight, and in other embodiments from about 20 to about 30% by weight units deriving from styrene, with the balance including units deriving from conjugated diene monomer, such as 1,3-butadiene, having low or medium cis content as described above.

In particular embodiments, the polymer chain may include a functional group located at the head of the polymer chain (i.e. the end of the polymer opposite the location of the residue of the functionalizing agent of the present invention. As those skilled in the art may appreciate, these polymers chains, which may be referred to as head-functionalized polymer chains, may be prepared by employing a functional anionic initiator, and the head of the polymer chain includes a functional group that is the residue of the functional initiator. The functional initiators that may employed are described above. In particular embodiments, the functional group located at the head of the head-functionalized chain can react or interact with reinforcing filler to reduce the 50° C. hysteresis loss of vulcanizates prepared there from as described above with respect to the initiator.

Use in Tires

The functionalized polymers of this invention are particularly useful in preparing tire components. In particular embodiments, these tire components include silica filler. These tire components can be prepared by using the functionalized polymers alone or together with other rubbery polymers (i.e., polymers that can be vulcanized to form compositions possessing elastomeric properties). Other rubbery polymers that may be used include natural and synthetic elastomers. The synthetic elastomers typically derive from the polymerization of conjugated diene monomers. These conjugated diene monomers may be copolymerized with other monomers such as vinyl-substituted aromatic monomers. Other rubbery polymers may derive from the polymerization of ethylene together with one or more α-olefins and optionally one or more diene monomers.

Useful rubbery polymers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents (also called vulcanizing agents) may be employed, including sulfur or peroxide-based curing systems. Curing agents are described in Kirk- Othmer, ENCYCLOPEDIA OF CHEMICAL TECHNOLOGY, Vol. 20, pgs. 365-468, (3$^{rd}$ Ed. 1982), particularly Vulcanization Agents and Auxiliary Materials, pgs. 390-402, and A. Y. Coran, Vulcanization, ENCYCLOPEDIA OF POLYMER SCIENCE AND ENGINEERING, (2$^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These rubber compositions are useful for forming tire components such as treads, subtreads, black sidewalls, body ply skins, bead filler, and the like. Preferably, the functional polymers are employed in tread and sidewall formulations. In one or more embodiments, these tread formulations may include from about 10% to about 100% by weight, in other embodiments from about 35% to about 90% by weight, and in other embodiments from about 50% to 80% by weight of the functionalized polymer based on the total weight of the rubber within the formulation.

In one or more embodiments, the vulcanizable rubber composition may be prepared by forming an initial masterbatch that includes the rubber component and filler (the rubber component optionally including the functionalized polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mixing stage, which preferably does not initiate the vulcanization process. For example, the vulcanizing agents may be introduced at a temperature less than 140° C., in other embodiments less than 120° C., and in other embodiments less than 110° C. Optionally, additional mixing stages, sometimes called remills, can be employed between the masterbatch mixing stage and the final mixing stage. Various ingredients including the functionalized polymer of this invention can be added during these remills. Rubber compounding techniques and the additives employed therein are generally known as disclosed in The Compounding and Vulcanization of Rubber, in Rubber Technology (2$^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the functionalized polymer of this invention and silica in the substantial absence of coupling and shielding agents.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example 1

Synthesis of N,N-bistrimethylsilylallylamine

Four 800 mL bottles were prepared in the following manner. To an 800 mL nitrogen purged glass bottle was added 400 mL anhydrous dichloromethane, 98.2 mL triethylamine, and 24.8 mL (0.33 mol) allylamine. The bottle was sealed and cooled in an ice bath for one hour. Then, 88.5 mL (0.70 mol) of 98% pure chlorotrimethylsilane was added. The reaction was agitated in a room temperature bath for two hours. The resulting solution was filtered and dichloromethane removed by rotary evaporation. To the residue from the four bottles was added 400 mL of pentane and solution was filtered again. Pentane was removed by rotary evaporation and product was isolated by vacuum distillation at 75-80° C. and 25 mm Hg (147 g, 55.3% yield). $^1$H NMR (300 MHz, C$_6$D$_6$) δ (ppm) 5.78-5.60 (1H, m), 5.18-5.05 (1H, dd), 4.97-4.90 (1H, dd), 3.33 (2H, d), 0.11 (18H, s).

Example 2

Synthesis of methyldi(2-dimethylaminoethoxy)silane

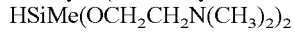

To an 800 mL nitrogen purged glass bottle was added 400 mL anhydrous dichloromethane, 98.2 mL triethylamine and 70.4 mL (0.70 mol) N,N-dimethylaminoethanol. The bottle was sealed and cooled in an ice bath for one hour. Then, 36.4 mL (0.35 mol) of >99% pure dichloromethylsilane was added. The reaction was agitated in a room temperature bath for three hours. The resulting solution was filtered and dichloromethane removed by rotary evaporation. To the residue was added 300 mL of pentane and solution was filtered again. Pentane was removed by rotary evaporation and product was isolated by vacuum distillation at 115-120° C. and 25 mm Hg (15.3 g, 19.7% yield). $^1$H NMR (300 MHz, CDCl$_3$) δ (ppm) 4.6 (1H, q), 3.85 (4H, t), 2.48 (4H, t), 2.28 (12H, s), 0.2 (3H, d).

Example 3

Synthesis of 1,5-dimethyl-1-aza-4,6-dioxa-5-silacyclooctane

To a sealed 800 mL nitrogen purged glass bottle was added 400 mL anhydrous dichloromethane and 98.2 mL triethylamine. Then, 3.65 mL (35 mmol) of 99+% dichloromethylsilane and 4.02 mL (35 mmol) di(hydroxyethyl)methylamine was added with shaking. This was repeated five times over twenty minutes until a total of 175 mmol of both dichloromethylsilane and di(hydroxyethyl)methylamine had been added. The bottle was agitated in a room temperature bath for 15 minutes. Then, five more additions of 4.02 mL (35 mmol) 99+% dichloromethylsilane and 4.02 mL (35 mmol) dihydroxyethyl)methylamine were done until a total of 36.44 mL (0.35 mol) of 99+% dichloromethylsilane and 40.2 mL (0.35 mol) dihydroxyethylmethylamine were reached. The bottle was then agitated overnight in a room temperature bath. The resulting solution was filtered and dichloromethane removed by rotary evaporation. To the residue was added 400 mL of pentane and solution was filtered again. Pentane was removed by rotary evaporation and product was isolated by vacuum distillation at 78-81° C. and 20 mm Hg (41.7 g, 73.5% yield). $^1$H NMR (300 MHz, CDCl$_3$) δ (ppm) 4.79 (1H, q), 3.83-3.71 (4H, m), 2.78-2.61 (4H, m), 2.37 (3H, s), 0.03 (3H, d).

Example 4

Synthesis of (N,N-bistrimethylsilylaminopropyl) methyldi(2-dimethylaminoethoxy)silane (Me$_2$NCH$_2$CH$_2$O)$_2$SiMe(CH$_2$CH$_2$CH$_2$N(SiMe$_3$)$_2$)

To a sealed 300 mL nitrogen purged glass bottle was added 11.05 g (50 mmol) methyldi(2-dimethylaminoethoxy)silane and 10.05 g (50 mmol) N,N-bistrimethylsilylallylamine and the bottle was heated to 75° C. with stirring. Then, 0.8 mL of a 2 wt % platinum solution of Karsted's catalyst in xylenes was added to the reaction. After 24 hrs, 0.4 mL of 0.2 wt % platinum solution of Karsted's catalyst in xylenes was added and reaction proceeded for another 24 hrs. The product was isolated by vacuum distillation (8.52 g, 40.4% yield). $^1$H NMR (300 MHz, C$_6$D$_6$) δ (ppm) 3.88 (4H, t), 2.84 (2H, t), 2.49 (4H, t), 2.16 (12H, s), 1.70-1.58 (2H, m), 0.60 (2H, t), 0.21 (18H, s). $^{13}$C NMR (MHz, C$_6$D$_6$) δ (ppm) 61.51 (2C), 60.86 (2C), 48.95 (1C), 46.17 (4C), 28.54 (1C), 11.07 (1C), 2.18 (6C), -4.87 (1C).

Example 5

Synthesis of 1,5-dimethyl-5-(N,N-bistrimethylsilylaminopropyl)-1-aza-4,6-dioxa-5-silacyclooctane To a sealed 300 mL nitrogen purged glass bottle was added 16.2 g (100 mmol) 1,5-dimethyl-1-aza-4,6-dioxa-5-silacyclooctane and 20.1 g (100 mmol) N,N-bistrimethylsilylallylamine and the bottle was heated to 75° C. with stirring. Then, 0.8 mL of a 2 wt % platinum solution of Karsted's catalyst in xylenes was added to the reaction. After 24 hrs, the product was isolated by vacuum distillation at 110° C. and 0.04 mm Hg (4.33 g, 11.9% yield). $^1$H NMR (300 MHz, C$_6$D$_6$) δ (ppm) 3.72 (4H, t), 2.71 (2H, t), 2.59 (4H, t), 2.41 (3H, s), 1.44-1.42 (2H, m), 0.44 (2H, t), 0.09 (3H, s), 0.06 (18H, s).

Example 6

Synthesis of SBR Control

To a 18.9 L stainless steel reactor equipped with turbine agitator blades was added 4.90 kg hexanes, 1.14 kg 34.0 wt % styrene in hexanes, and 7.50 kg 22.1 wt % 1,3-butadiene in hexanes. To the reactor was charged 10.76 mL of 1.65 M n-butyl lithium in hexanes, 3.44 mL of 1.60 M 2,2-ditetrahydrofurylpropane (DTHFP) in hexanes and the batch was heated to an exotherm of 60.2° C. Approximately 90 minutes after exotherm, a portion of the contents were discharged into isopropanol containing antioxidant. The polymer was drum dried to yield a polymer with the following properties: $M_n$=110.6 kg/mol, $M_w$=114.4 kg/mol, Tg=-34.6° C., % Styrene=19.8, % Block Styrene (Styrene=100%)=8.1, % Vinyl (Butadiene=100%)=58.3.

Example 7

Synthesis of SBR terminated with (N,N-bistrimethylsilylaminopropyl)methyldi(2-dimethylaminoethoxy)silane A portion of the unterminated polymer solution from example 6 was discharged into dry nitrogen purged 800 mL sealed glass bottles. To each bottle was added 1.0 mol (N,N-bistrimethylsilylaminopropyl)methyldi(2-dimethylaminoethoxy)silane/mol lithium calculated to be in the weight of polymer solution. The polymer was coagulated in isopropanol containing antioxidant and drum dried to yield a polymer with the following properties: Mn=116.2 kg/mol, Mw=128.0 kg/mol, Tg=-34.6° C., % Styrene=19.8, % Block Styrene (Styrene=100%)=8.1, % Vinyl (Butadiene=100%)=58.3.

Example 8

Synthesis of SBR terminated with 1,5-dimethyl-5-(N,N-bistrimethylsilylaminopropyl)-1-aza-4,6-dioxa-5-silacyclooctane A portion of the unterminated polymer solution from example 6 was discharged into dry nitrogen purged 800 mL sealed glass bottles. To each bottle was added 1.0 mol 1,5-dimethyl-5-(N,N-bistrimethylsilylaminopropyl)-1-aza-4,6-dioxa-5-silacyclooctane/mol lithium calculated to be in the weight of polymer solution. The polymer was coagulated in isopropanol containing antioxidant and drum dried to yield a polymer with the following properties: Mn=147.5 kg/mol, Mw=1175.7.0 kg/mol, Tg=-34.6° C., % Styrene=19.8, % Block Styrene (Styrene=100%)=8.1, % Vinyl (Butadiene=100%)=58.3.

Examples 9-11

Synthesis of 2-(4-dimethylaminophenyl)-1,3-dithiane (DMAPDT) functionalized SBR control To a 18.9 L stainless steel reactor equipped with turbine agitator blades was added 4.85 kg hexanes, 1.14 kg 34.0 wt % styrene in hexanes, and 7.55 kg 22.1 wt % 1,3-butadiene in hexanes. To the reactor was charged initiator and modifier shown in Table I and the batch was heated to an exotherm of approximately 60° C. Approximately 60 minutes after exotherm, a portion of the contents were discharged into isopropanol containing antioxidant. The polymer was drum dried to yield polymer with properties listed in Table I.

TABLE I

| | DMAPDT Control Polymers | | |
|---|---|---|---|
| Example | 9 | 10 | 11 |
| DMAPDT, g | 6.70 | 5.58 | 4.65 |
| 1.6M DTHFP, mL | 3.85 | 3.35 | 2.79 |

TABLE I-continued

| DMAPDT Control Polymers | | | |
|---|---|---|---|
| Example | 9 | 10 | 11 |
| 1M Triethylamine, mL | 12.32 | 10.26 | 8.55 |
| THF, mL | 56.0 | 46.7 | 38.9 |
| $M_n$, (kg/mol) | 97.3 | 103.6 | 123.1 |
| $M_w$, (kg/mol) | 105.2 | 115.7 | 144.0 |
| Tg, ° C. | −32.3 | −33.6 | −36.1 |
| % Styrene | 20.1 | 19.9 | 19.9 |
| % Vinyl (Butadiene = 100%) | 58.3 | 56.8 | 55.1 |

Examples 12-15

Synthesis of 2-(4-dimethylaminophenyl)-1,3-dithiane functionalized SBR terminated with (N,N-bistrimethylsilylaminopropyl)methyldi(2-dimethylaminoethoxy)silane A portion of the unterminated polymer solution from example 9-11 was discharged into dry nitrogen purged 800 mL sealed glass bottles. To each bottle was added 1.0 mol (N,N-bistrimethylsilylaminopropyl)methyldi(2-dimethylaminoethoxy)silane/mol lithium calculated to be in the weight of polymer solution. The polymer was coagulated in isopropanol containing antioxidant and drum dried to yield polymer with the properties listed in Table II.

TABLE II

| DMAPDT-SBR-(N,N-bistrimethylsilylaminopropyl)-methyldi(2-dimethylaminoethoxy)silane | | | |
|---|---|---|---|
| Example | 12 | 13 | 14 |
| $M_n$, (kg/mol) | 98.8 | 108.2 | 134.1 |
| $M_w$, (kg/mol) | 115.6 | 125.1 | 159.8 |
| Tg, ° C. | −32.3 | −33.6 | −36.1 |
| % Styrene | 20.1 | 19.9 | 19.9 |
| % Vinyl (Butadiene = 100%) | 58.3 | 56.8 | 55.1 |

Example 16-18

Synthesis of 2-(4-dimethylaminophenyl)-1,3-dithiane functionalized SBR terminated with 1,5-dimethyl-5-(N,N-bistrimethylsilylaminopropyl)-1-aza-4,6-dioxa-5-silacyclooctane A portion of the unterminated polymer solution from example 9-11 was discharged into dry nitrogen purged 800 mL sealed glass bottles. To each bottle was added 1.0 mol 1,5-dimethyl-5-(N,N-bistrimethylsilylaminopropyl)-1-aza-4,6-dioxa-5-silacyclooctane/mol lithium calculated to be in the weight of polymer solution. The polymer was coagulated in isopropanol containing antioxidant and drum dried to yield polymer with the properties listed in Table III.

TABLE III

| DMAPDT-SBR-1,5-dimethyl-5-(N,N-bistrimethylsilylaminopropyl)-1-aza-4,6-dioxa-5-silacyclooctane | | | |
|---|---|---|---|
| Example | 15 | 16 | 17 |
| $M_n$, (kg/mol) | 125.3 | 139.9 | 185.1 |
| $M_w$, (kg/mol) | 160.5 | 177.7 | 232.7 |
| Tg, ° C. | −32.3 | −33.6 | −36.1 |
| % Styrene | 20.1 | 19.9 | 19.9 |
| % Vinyl (Butadiene = 100%) | 58.3 | 56.8 | 55.1 |

A total of 12 silica-filled compounds were prepared with the SBR samples described above (Example 6 to Example 18). The compounding formulation is set forth in Table IV.

TABLE IV

| Compounding Formulas | | |
|---|---|---|
| Formulation | | Parts by weight |
| MB | SBR (Examples 6-18) | 50 |
| | IR | 50 |
| | Silica | 55 |
| | Silane Si 75 | 5 |
| | Black oil | 10 |
| | Stearic acid | 2 |
| | Waxblend | 2 |
| | 6PPD | 1 |
| RM | | |
| FB | ZnO | 2.5 |
| | DPG | 1.4 |
| | TBBS | 0.7 |
| | MBTS | 2 |
| | Sulfur | 1.5 |
| | Total (phr) | 183.1 |

Each compound is made of 50 phr of one SBR, 50 phr of synthetic polyisoprene (IR), 55 phr of precipitated silica (Hi-Sil® 190G; PPG), and 5 phr of a silane coupling agent (Si 75; Evonik) along with other typical ingredients. Three stages of mixing (master batch, remill and final batch) were carried out for each compound with a 65-gram Brabender internal mixer. The silane coupling agent was added during the master batch mixing.

After vulcanization under high pressure at high temperature, physical and dynamic properties of the compounds were tested, and the results are set forth in Table V.

TABLE V

| Compound Properties | | | | | | | | | | | | |
|---|---|---|---|---|---|---|---|---|---|---|---|---|
| Compound | Comp 1 | Exp 1 | Exp 2 | Comp 2 | Comp 3 | Comp 4 | Exp 3 | Exp 4 | Exp 5 | Exp 6 | Exp 7 | Exp 8 |
| Bound Rubber | 26.8 | 59.2 | 38.7 | 29.9 | 27.6 | 25.1 | 56.4 | 54.9 | 52.0 | 38.4 | 40.3 | 37.7 |
| Mooney at 130° C. | 42.6 | 64.3 | 60.3 | 42.8 | 45.1 | 49.3 | 56.6 | 64.3 | 69.3 | 63.2 | 65.1 | 69.1 |
| Tensile at RT | | | | | | | | | | | | |
| Mod50% MPa | 2.221 | 2.354 | 2.359 | 2.307 | 2.304 | 2.475 | 2.507 | 2.482 | 2.306 | 2.407 | 2.331 | 2.406 |

TABLE V-continued

| Compound Properties | | | | | | | | | | | | |
|---|---|---|---|---|---|---|---|---|---|---|---|---|
| Compound | Comp 1 | Exp 1 | Exp 2 | Comp 2 | Comp 3 | Comp 4 | Exp 3 | Exp 4 | Exp 5 | Exp 6 | Exp 7 | Exp 8 |
| Mod 200% MPa | 8.823 | 10.206 | 10.081 | 9.429 | 9.64 | 10.645 | 10.982 | 11.498 | 10.817 | 10.041 | 10.101 | 11.012 |
| Mod 300% MPa | 15.05 | 17.112 | 17.61 | 16.193 | 16.574 | 17.959 | 18.594 | 19.391 | 18.734 | 17.266 | 16.946 | 18.844 |
| Tb MPa | 22.4 | 24.5 | 17.5 | 22.8 | 24.5 | 23 | 21.7 | 26.2 | 21.6 | 25.1 | 21.5 | 24.3 |
| Eb % | 410.0 | 403.4 | 299.7 | 391.6 | 404.2 | 366.2 | 337.6 | 378.9 | 333.7 | 399.4 | 353.9 | 365.7 |
| Strain Swp at 50° C. at 15 Hz | | | | | | | | | | | | |
| G' at 10.0% MPa | 3.07 | 2.71 | 2.78 | 3.04 | 2.94 | 3.14 | 2.72 | 2.76 | 2.77 | 3.13 | 2.82 | 3.01 |
| Tanδ at 10.0% | 0.202 | 0.167 | 0.181 | 0.194 | 0.194 | 0.186 | 0.161 | 0.156 | 0.149 | 0.18 | 0.17 | 0.168 |
| Temp Ramp test at 1 Hz | | | | | | | | | | | | |
| Tanδ at −0.6° C. 98% | 0.183 | 0.194 | 0.21 | 0.188 | 0.195 | 0.193 | 0.211 | 0.193 | 0.2 | 0.21 | 0.188 | 0.194 |

The Mooney viscosity ($ML_{1+4}$) of the uncured rubber compound was determined at 130° C. by using a Alpha Technologies Mooney viscometer with a large rotor, a one-minute warm-up time, and a four-minute running time. The tensile mechanical properties (modulus, $T_b$, and $E_b$) of the vulcanizates were measured by using the standard procedure described in ASTM-D412. The hysteresis data (tan δ) of the vulcanizates were obtained from a dynamic strain-sweep experiment, which was conducted at 50° C. and 15 Hz with strain sweeping from 0.1% to 20%.

Bound rubber, a measure of the percentage of rubber bound, through some interaction, to the filler, was determined by solvent extraction with toluene at room temperature. More specifically, a test specimen of each uncured rubber formulation was placed in toluene for three days. The solvent was removed and the residue was dried and weighed. The percentage of bound rubber was then determined according to the formula:

$$\% \text{ bound rubber} = (100(W_d - F))/R$$

where $W_d$ is the weight of the dried residue, F is the weight of the filler and any other solvent insoluble matter in the original sample, and R is the weight of the rubber in the original sample.

In comparison to the compound (Comparative 1) made of the control SBR (Example 6) and the compounds (Comparative 2 to 4) made of the DMAPDT control polymers (Examples 9 to 11), the compounds (Experimental 1 to 8) made of a functionalized SBR (Examples 7, 8, 12 to 18) of the current invention exhibit higher bound rubber content and lower loss tangent at 50° C. (hence lower rolling loss for tire tread). Additionally, in comparison to the compound (Comparative 1) made of the control SBR (Example 6), the compounds (Experimental 1 to 8) made of a functionalized SBR (Examples 7, 8, 12 to 18) of the current invention also show a higher loss tangent at around 0° C. (a conventional predictor for wet skid resistance of tread compound).

Various modifications and alterations that do not depart from the scope and spirit of this invention will become apparent to those skilled in the art. This invention is not to be duly limited to the illustrative embodiments set forth herein.

What is claimed is:

1. A method for preparing a functionalized polymer, the method comprising the step of:
reacting a reactive polymer with a functionalizing agent defined by formula I or formula II:

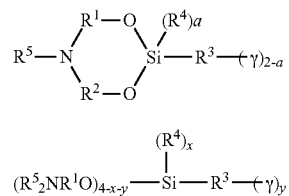

or combinations thereof, where $R^1$, $R^2$, and $R^3$ are each independently a divalent organic group, $R^4$ and $R^5$ are each independently a monovalent organic group, a is an integer from 0 to 1, x is an integer from 0 to 2, y is an integer from 1 to 3, x+y≤3, and γ is a protected amino group.

2. The method of claim 1, where the functionalizing agent is a cyclic amino alkoxysilane defined by the formula I:

$$R^5-N\underset{R^2-O}{\overset{R^1-O}{\diagdown}}Si\overset{(R^4)_a}{\diagup}-R^3-(\gamma)_{2-a} \qquad \text{I}$$

where $R^1$, $R^2$, and $R^3$ are each independently a divalent organic group, $R^4$ and $R^5$ are each independently a monovalent organic group, a is an integer from 0 to 1, and γ is a protected amino group.

3. The method of claim 1, where the functionalizing agent is an acyclic amino alkoxysilane defined by the Formula II:

$$(R^5{}_2NR^1O)_{4-x-y}-\underset{\underset{}{|}}{\overset{(R^4)_x}{Si}}-R^3-(\gamma)_y \qquad \text{II}$$

where $R^1$, $R^2$, and $R^3$ are each independently a divalent organic group, $R^4$ and $R^5$ are each independently a monovalent organic group, x is an integer from 0 to 2, y is an integer from 1 to 3, x+y=3, and γ is a protected amino group.

4. The method of claim 1, where the protected amino group is selected from the group consisting of bis(trihydrocarbylsilyl)amino, bis(dihydrocarbylhydrosilyl)amino, 1-aza-2,ω-disilacyclohydrocarbyl, (trihydrocarbylsilyl)(hydrocarbyl)amino, (dihydrocarbylhydrosilyl)(hydrocarbyl)amino, 1-aza-2-silacyclohydrocarbyl, dihydrocarbylamino, 1-azacyclohydrocarbyl, and hydrocarbylimino groups.

5. The method of claim 4, where the protected amino group is a bis(trihydrocarbylsilyl)amino group defined by the Formula III:

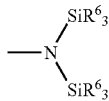

where each $R^6$ is independently a monovalent organic group.

6. The method of claim 4, where the protected amino group is a bis(dihydrocarbylhydrosilyl)amino group defined by the Formula IV:

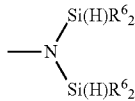

where each $R^6$ is independently a monovalent organic group.

7. The method of claim 4, where the protected amino group is a 1-aza-2,ω-disilacyclohydrocarbyl group defined by the Formula V

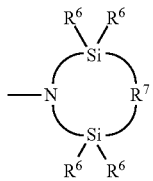

where each $R^6$ is independently a monovalent organic group and $R^7$ is a divalent organic group.

8. The method of claim 4, where the protected amino group is a (trihydrocarbylsilyl)(hydrocarbyl)amino group defined by the Formula VI:

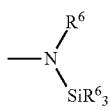

where each $R^6$ is independently a monovalent organic group.

9. The method of claim 4, where the protected amino group is a (dihydrocarbylhydrosilyl)(hydrocarbyl)amino group defined by the formula VII:

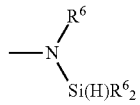

where each $R^6$ is independently a monovalent organic group.

10. The method of claim 4, where the protected amino group is a 1-aza-2-silacyclohydrocarbyl amino group defined by the Formula VIII:

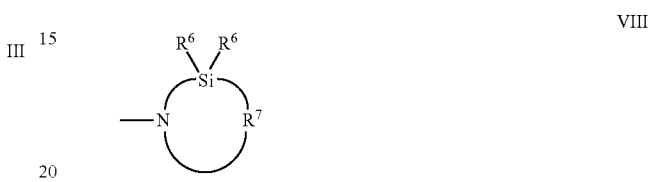

where each $R^6$ is independently a monovalent organic group and where $R^7$ is a divalent organic group.

11. The method of claim 4, where the protected amino group is a Dihydrocarbylamino group defined by the Formula IX:

where each $R^6$ is independently a monovalent organic group.

12. The method of claim 4, where the protected amino group is a 1-azacyclohydrocarbyl amino group defined by the Formula X:

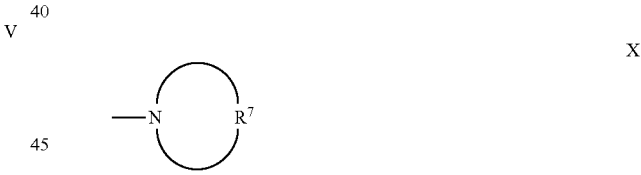

where $R^7$ is a divalent organic group.

13. The method of claim 4, where the protected amino group is a hydrocarbylimino group defined by the Formula XI:

where each $R^6$ are individually a monovalent organic group, or where two $R^6$ may join to form a divalent organic group.

14. The method of claim 1, where the reactive polymer is an anionically-polymerized polymer.

15. The method of claim 14, where the anionically-polymerized polymer is prepared by polymerizing conjugated diene monomer, optionally together with vinyl aromatic monomer, by employing an organolithium initiator.

16. A method for preparing a functionalized polymer, the method comprising the step of:

reacting a reactive polymer with a functionalizing agent wherein is selected from the group consisting of acyclic aminoalkoxy silanes containing a protected amino group and cyclic aminoalkoxy silanes containing a protected amino group.

17. The method of claim 16, where the functionalizing agent is an acyclic aminoalkoxy silane functionalizing agent selected from the group consisting of (bis(trihydrocarbylsilyl)amino)(hydrocarbyl)[di(hydrocarbylaminohydrocarbyloxy)]silanes, (bis(dihydrocarbylhydrosilyl)amino)(hydrocarbyl)[di(hydrocarbylaminohydrocarbyloxy)]silanes, (1-aza-2,ω-disilacyclohydrocarbyl)(hydrocarbyl)[di(hydrocarbylaminohydrocarbyloxy)]silanes, [(trihydrocarbylsilyl)(hydrocarbyl)amino](hydrocarbyl)[di(hydrocarbylaminohydrocarbyloxy)]silanes, [(dihydrocarbylhydrosilyl)(hydrocarbyl)amino](hydrocarbyl)[di(hydrocarbylaminohydrocarbyloxy)]silanes, (1-aza-2-silacyclohydrocarbyl)(hydrocarbyl)[di(hydrocarbylaminohydrocarbyloxy)]silanes, (dihydrocarbylamino)(hydrocarbyl)[di(hydrocarbylaminohydrocarbyloxy)]silanes, (1-azacyclohydrocarbyl)(hydrocarbyl)[di(hydrocarbylaminohydrocarbyloxy)]silanes, (hydrocarbylimino)(hydrocarbyl)[di(hydrocarbylaminohydrocarbyloxy)]silanes, (bis(trihydrocarbylsilyl)amino)(dihydrocarbyl)(hydrocarbylaminohydrocarbyloxy)silanes, (bis(dihydrocarbylhydrosilyl)amino)(dihydrocarbyl)(hydrocarbylaminohydrocarbyloxy)silanes, (1-aza-2,ω-disilacyclohydrocarbyl)(dihydrocarbyl)(hydrocarbylaminohydrocarbyloxy)silanes, [(trihydrocarbylsilyl)(hydrocarbyl)amino](dihydrocarbyl)(hydrocarbylaminohydrocarbyloxy)silanes, [(dihydrocarbylhydrosilyl)(hydrocarbyl)amino](dihydrocarbyl)(hydrocarbylaminohydrocarbyloxy)silanes, (1-aza-2-silacyclohydrocarbyl)(dihydrocarbyl)(hydrocarbylaminohydrocarbyloxy)silanes, (dihydrocarbylamino)(dihydrocarbyl)(hydrocarbylaminohydrocarbyloxy)silanes, (1-azacyclohydrocarbyl)(dihydrocarbyl)(hydrocarbylaminohydrocarbyloxy)silanes, (hydrocarbylimino)(dihydrocarbyl)(hydrocarbylaminohydrocarbyloxy)silanes, [di(bis(dihydrocarbylhydrosilyl)amino)][di(hydrocarbylaminohydrocarbyloxy)]silanes [di(bis(dihydrocarbylhydrosilyl)amino)][di(hydrocarbylaminohydrocarbyloxy)]silanes, [di(1-aza-2,ω-disilacyclohydrocarbyl)][di(hydrocarbylaminohydrocarbyloxy)]silanes, [di[(trihydrocarbylsilyl)(hydrocarbyl)amino)]][di(hydrocarbylaminohydrocarbyloxy)]silanes, [di[(dihydrocarbylhydrosilyl)(hydrocarbyl)amino)]][di(hydrocarbylaminohydrocarbyloxy)]silanes, [di(1-aza-2-silacyclohydrocarbyl)][di(hydrocarbylaminohydrocarbyloxy)]silanes, [di(dihydrocarbylamino)][di(hydrocarbylaminohydrocarbyloxy)]silanes, [di(1-azacyclohydrocarbyl)][di(hydrocarbylaminohydrocarbyloxy)]silanes, and [di(hydrocarbylimino)][di(hydrocarbylaminohydrocarbyloxy)]silanes.

18. The method of claim 16, where the functionalizing agent is a cyclic aminoalkoxy silane functionalizing agent selected from the group consisting of 1,5-dimethyl-5-(N,N-bis(trimethylsilyl)aminopropyl)-1-aza-4,6-dioxa-5-silacyclooctane, 1,5-dimethyl-5-(N,N-bis(dimethylhydrosilyl)aminopropyl)-1-aza-4,6-dioxa-5-silacyclooctane, 1,5-dimethyl-5-(2,2,5,5-tetramethyl-1-aza-2,5-disila-1-cyclopentylpropyl)-1-aza-4,6-dioxa-5-silacyclooctane, 1,5-dimethyl-5-(N,N-(trimethylsilyl)(methyl)aminopropyl)-1-aza-4,6-dioxa-5-silacyclooctane, 1,5-dimethyl-5-(dimethylhydrosilyl)(methyl)aminopropyl)-1-aza-4,6-dioxa-5-silacyclooctane, 1,5-dimethyl-5-(2,2-dimethyl-1-aza-2-sila-1-cyclopentylpropyl)-1-aza-4,6-dioxa-5-silacyclooctane, 1,5-dimethyl-5-(N,N-dimethylaminopropyl)-1-aza-4,6-dioxa-5-silacyclooctane, 1,5-dimethyl-5-(piperidinopropyl)-1-aza-4,6-dioxa-5-silacyclooctane, and 1,5-dimethyl-5-(propyliminopropyl)-1-aza-4,6-dioxa-5-silacyclooctane.

19. The method of claim 16, where the functionalizing agent is a cyclic aminoalkoxy silane functionalizing agent selected from the group consisting of 1-methyl-5,5-di(N,N-bis(trimethylsilyl)aminopropyl)-1-aza-4,6-dioxa-5-silacyclooctane, 1-methyl-5,5-di(N,N-bis(dimethylhydrosilyl)aminopropyl)-1-aza-4,6-dioxa-5-silacyclooctane. 1-methyl-5,5-di(2,2,5,5-tetramethyl-1-aza-2,5-disila-1-cyclopentylpropyl)-1-aza-4,6-dioxa-5-silacyclooctane, 1-methyl-5,5-di(N,N-(trimethylsilyl)(methyl)aminopropyl)-1-aza-4,6-dioxa-5-silacyclooctane, 1-methyl-5,5-di(dimethylhydrosilyl)(methyl)aminopropyl)-1-aza-4,6-dioxa-5-silacyclooctane, 1-methyl-5,5-di(2,2-dimethyl-1-aza-2-sila-1-cyclopentylpropyl)-1-aza-4,6-dioxa-5-silacyclooctane, 1-methyl-5,5-di(N,N-dimethylaminopropyl)-1-aza-4,6-dioxa-5-silacyclooctane, 1-methyl-5,5-di(piperidinopropyl)-1-aza-4,6-dioxa-5-silacyclooctane, and 1-methyl-5,5-di(propyliminopropyl)-1-aza-4,6-dioxa-5-silacyclooctane.

20. The method of claim 16, where the functionalizing agent is a cyclic aminoalkoxy silane functionalizing agent selected from the group consisting of 1-ethyl-4-methyl-4-(N,N-bis(trimethylsilyl)aminopropyl)-1-aza-3,5-dioxa-4-silacyclohexane, 1-ethyl-4-methyl-4-(N,N-bis(dimethylhydrosilyl)aminopropyl)-1-aza-3,5-dioxa-4-silacyclohexane, 1-ethyl-4-methyl-4-(2,2,5,5-tetramethyl-1-aza-2,5-disila-1-cyclopentylpropyl)-1-aza-3,5-dioxa-4-silacyclohexane, 1-ethyl-4-methyl-4-(trimethylsilyl)(methyl)aminopropyl)-1-aza-3,5-dioxa-4-silacyclohexane, 1-ethyl-4-methyl-4-(dimethylhydrosilyl)(methyl)aminopropyl)-1-aza-3,5-dioxa-4-silacyclohexane, 1-ethyl-4-methyl-4-(2,2-dimethyl-1-aza-2-sila-1-cyclopentylpropyl)-1-aza-3,5-dioxa-4-silacyclohexane, 1-ethyl-4-methyl-4-(N,N-dimethylaminopropyl)-1-aza-3,5-dioxa-4-silacyclohexane, 1-ethyl-4-methyl-4-(piperidinopropyl)-1-aza-3,5-dioxa-4-silacyclohexane, and 1-ethyl-4-methyl-4-((propyliminopropyl)-1-aza-3,5-dioxa-4-silacyclohexane.

21. The method of claim 16, where the functionalizing agent is a cyclic aminoalkoxy silane functionalizing agent selected from the group consisting of (N,N-bis(trimethylsilyl)aminopropyl)(methyl) [di(2-dimethylaminoethoxy)]silane, (N,N-bis(dimethylhydrosilyl)aminopropyl)(methyl)[di(2-dimethylaminoethoxy)]silane, (2,2,5,5-tetramethyl-1-aza-2,5-disila-1-cyclopentylpropyl)(methyl) [di(2-dimethylaminoethoxy)]silane, (N,N-(trimethylsilyl)(methyl)aminopropyl)(methyl)[di(2-dimethylaminoethoxy)]silane, (N,N-(dimethylhydrosilyl)(methyl)aminopropyl)(methyl)[di(2-dimethylaminoethoxy)]silane, (2,2-dimethyl-1-aza-2-sila-1-cyclopentylpropyl)(methyl)[di(2-dimethylaminoethoxy)]silane, (N,N-dimethylaminopropyl)(methyl)[di(2-dimethylaminoethoxy)]silane, (piperidinopropyl)(methyl) [di(2-dimethylaminoethoxy)]silane, and (propyliminopropyl)(methyl) [di(2-dimethylaminoethoxy)]silane.

22. The method of claim 16, where the functionalizing agent is an acyclic aminoalkoxy silane functionalizing agent selected from the group consisting of (N,N-bis(trimethylsilyl)aminopropyl)(dimethyl)(2-dimethylaminoethoxy)silane, (N,N-bis(dimethylhydrosilyl)aminopropyl)(dimethyl)(2-dimethylaminoethoxy)silane, (2,2,5,5-tetramethyl-1-aza-2,5-disila-1-cyclopentylpropyl)(dimethyl)(2-dimethylaminoethoxy)silane, (N,N-(trimethylsilyl)(methyl)aminopropyl)(dimethyl)(2-dimethylaminoethoxy)silane, (N,N-(dimethylhydrosilyl)(methyl)aminopropyl)(dimethyl)(2-dimethylaminoethoxy)silane, (2,2-dimethyl-1-aza-2-sila-1-cyclopentylpropyl)(dimethyl)(2-dimethylaminoethoxy)silane, (N,N-dimethylaminopropyl)(dimethyl)(2-dimethylaminoethoxy)silane, (piperidinopropyl)(dimethyl)(2-dimethylaminoethoxy)silane, and (propyliminopropyl)(dimethyl)(2-dimethylaminoethoxy)silane.

23. The method of claim 16, where the functionalizing agent is an acyclic aminoalkoxy silane functionalizing agent selected from the group consisting of [di(N,N-bis(trimethylsilyl)aminopropyl)][di(2-dimethylaminoethoxy)]silane, [di(N,N-bis(dimethylhydrosilyl)aminopropyl)][di(2-dimethylaminoethoxy)]silane, [di(2,2,5,5-tetramethyl-1-aza-2,5-disila-1-cyclopentylpropyl)][di(2-dimethylaminoethoxy)]silane, [di(N,N-(trimethylsilyl)(methyl)aminopropyl)][di(2-dimethylaminoethoxy)]silane, [di(N,N-(dimethylhydrosilyl)(methyl)aminopropyl)][di(2-dimethylaminoethoxy)]silane, [di(2,2-dimethyl-1-aza-2-sila-1-cyclopentylpropyl)][di(2-dimethylaminoethoxy)]silane, [di(N,N-dimethylaminopropyl)][di(2-dimethylaminoethoxy)]silane, [di(piperidinopropyl)][di(2-dimethylaminoethoxy)]silane, and [(propyliminopropyl)][di(2-dimethylaminoethoxy)]silane.

24. A method defined by the Formula XII or XIII:

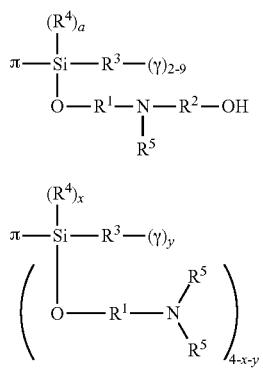

or combinations thereof, where $R^1$, $R^2$, and $R^3$ are each independently a divalent organic group, $R^4$ and $R^5$ are each independently a monovalent organic group, a is an integer from 0 to 1, x is an integer from 0 to 2, y is an integer from 1 to 3, x+y=3, γ is a protected amino group, and π is an anionically-polymerized polymer chain.

25. The method of claim 24, where the anionically-polymerized polymer chain is a medium or low cis polydiene or polydiene copolymer.

26. The method of claim 24, where the anionically-polymerized polymer chain is selected from the group consisting of polybutadiene, polyisoprene, poly(styrene-co-butadiene), poly(styrene-co-butadiene-co-isoprene), poly(isoprene-co-styrene), and poly(butadiene-co-isoprene).

27. A vulcanizable composition of matter including silica and a functionalized polymer defined by formula XII or XIII

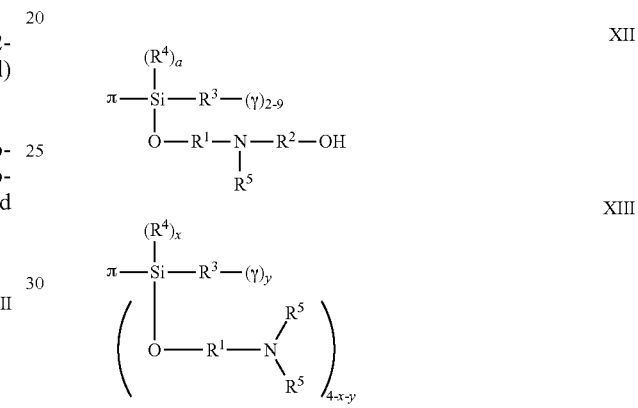

or combinations thereof, where $R^1$, $R^2$, and $R^3$ are each independently a divalent organic group, $R^4$ and $R^5$ are each independently a monovalent organic group, a is an integer from 0 to 1, x is an integer from 0 to 2, y is an integer from 1 to 3, x+y=3, γ is a protected amino group, and π is an anionically-polymerized polymer chain.

28. A tire tread prepared from the vulcanizable composition of claim 27.

* * * * *